(12) United States Patent
Kaizawa et al.

(10) Patent No.: US 7,957,366 B2
(45) Date of Patent: Jun. 7, 2011

(54) IP TELEPHONE SYSTEM, IP TELEPHONE APPARATUS AND CALLING METHOD

(75) Inventors: Yasuhito Kaizawa, Kanagawa (JP); Kazuto Kobayashi, Kanagawa (JP); Akira Miyajima, Kanagawa (JP)

(73) Assignee: PANASONIC Corporation, Osaka (JP)

( * ) Notice: Subject to any disclaimer, the term of this patent is extended or adjusted under 35 U.S.C. 154(b) by 1443 days.

(21) Appl. No.: 11/082,796

(22) Filed: Mar. 18, 2005

(65) Prior Publication Data
US 2005/0226223 A1    Oct. 13, 2005

(30) Foreign Application Priority Data

Apr. 12, 2004   (JP) ................................. 2004-117245

(51) Int. Cl.
    *H04L 12/66*   (2006.01)
(52) U.S. Cl. ...................................................... 370/352
(58) Field of Classification Search .................... 370/352
    See application file for complete search history.

(56) References Cited

U.S. PATENT DOCUMENTS

| | | | | |
|---|---|---|---|---|
| 6,157,636 | A * | 12/2000 | Voit et al. ..................... | 370/353 |
| 6,292,478 | B1 * | 9/2001 | Farris ............................ | 370/352 |
| 6,324,264 | B1 * | 11/2001 | Wiener et al. ............. | 379/88.22 |
| 6,347,085 | B2 * | 2/2002 | Kelly ............................. | 370/352 |
| 6,359,880 | B1 * | 3/2002 | Curry et al. .................... | 370/352 |
| 6,373,817 | B1 * | 4/2002 | Kung et al. .................... | 370/217 |
| 6,594,254 | B1 * | 7/2003 | Kelly ............................. | 370/352 |
| 6,839,421 | B2 * | 1/2005 | Ferraro Esparza et al. ........................ | 379/220.01 |
| 6,917,612 | B2 * | 7/2005 | Foti et al. ...................... | 370/352 |
| 7,644,181 | B2 * | 1/2010 | Plata Andres et al. ........ | 709/239 |
| 2002/0027915 | A1 | 3/2002 | Foti et al. | |
| 2003/0007482 | A1 * | 1/2003 | Khello et al. .................. | 370/352 |
| 2003/0074461 | A1 * | 4/2003 | Kang et al. .................... | 709/230 |
| 2003/0088765 | A1 * | 5/2003 | Eschbach et al. ............. | 713/150 |
| 2003/0110292 | A1 * | 6/2003 | Takeda et al. ................. | 709/245 |
| 2003/0193486 | A1 * | 10/2003 | Estrop ........................... | 345/204 |

(Continued)

FOREIGN PATENT DOCUMENTS

EP            1511282           3/2005

(Continued)

OTHER PUBLICATIONS

Network Working Group M. Mealling R. Daniel Request for Comments: 2915 Updates: 2168, Sep. 2000.*

(Continued)

*Primary Examiner* — Nathan Flynn
*Assistant Examiner* — Wutchung Chu
(74) *Attorney, Agent, or Firm* — Greenblum & Bernstein, P.L.C.

(57) ABSTRACT

An IP telephone system comprises an IP telephone that performs voice communication via an IP network, a carrier that manages voice communication for the IP telephone via the IP network and a server that returns NAPTR resource record(s) in response to a request from the IP telephone. In the IP telephone system, when the IP telephone performs voice communication via the IP network, the IP telephone transmits, to the server, a request for NAPTR resource record(s) that correspond(s) to the telephone number of the destination terminal. When NAPTR resource record(s) is(are) stored, voice communication is directly performed between the IP telephone and the destination terminal via the IP network according to the NAPTR resource record. On the other hand, when NAPTR resource record(s) is(are) not stored, the carrier manages calls, and voice communication is performed between the IP telephone and the destination terminal via the IP network.

15 Claims, 10 Drawing Sheets

U.S. PATENT DOCUMENTS

| | | | |
|---|---|---|---|
| 2004/0052346 A1 | 3/2004 | Ohta et al. | |
| 2004/0057421 A1* | 3/2004 | Kawabata et al. | 370/352 |
| 2004/0193725 A1* | 9/2004 | Costa-Requena et al. | 709/238 |
| 2004/0199649 A1* | 10/2004 | Tarnanen et al. | 709/230 |
| 2004/0260824 A1* | 12/2004 | Berard et al. | 709/230 |
| 2005/0182781 A1 | 8/2005 | Bouvet | |
| 2006/0013195 A1 | 1/2006 | Son et al. | |

FOREIGN PATENT DOCUMENTS

| | | |
|---|---|---|
| JP | 2002-118601 | 4/2002 |
| JP | 2003-333106 | 11/2003 |
| KR | 2003-0022448 | 3/2003 |
| KR | 2004-0028333 | 4/2004 |
| WO | 01/71989 | 9/2001 |
| WO | 03/103259 | 11/2003 |
| WO | 03/107627 | 12/2003 |

OTHER PUBLICATIONS

English language abstract of WO 0171989 (A1).

Faltstrom, Cisco Systems Inc.,"E.164 number and DNS; rfc2916.txt," IETF Standard, Internet Engineering Task Force, IETF, CH, Sep. 2000 XP015008699.

Blank et al., "ENUM-Domains bei der DENIC Eg" Online, Mar. 10, 2004 pp. 1-29 XP002375278, retrieved from the Internet: URL: www.denic.de/media/pdf/enum/veranstaltungen/pre-reader_20040316.pdf, retrieved on Mar. 29, 2006, together with a partial English language translation of the same.

Faltstrom Cisco Systems Inc.,et al., "The E.164 to Uniform Resource Identifiers (URI) Dynamic Delegation Discovery System (DDDS) Application (ENUM); rfc3761.txt," IETF Standard, Internet Engineering Task Force, IETF, CH, Apr. 2004 XP015009541.

Lind, "ENUM Call Flows for VoIP Internetworking; draft-lind-enum-callflows-03.txt," IETF Standard-Working-Draft.Internet Engineering Task Force, IETF, CH, No. 3, Feb. 2002, XP015004214.

"Report of the Department of State ITAC-T Advisory Committee Study Group A Ad Hoc on ENUM," Online, Jun. 6, 2001.

English language Abstract of JP 2002-118601, Apr. 19, 2002.

English language Abstract of JP 2003-333106.

U.S. Appl. No. 10/995,506 to Miyajima et al., which was filed on Nov. 24, 2004.

U.S. Appl. No. 10/995,507 to Miyajima et al., which was filed on Nov. 24, 2004.

U.S. Appl. No. 10/995,503 to Miyajima et al., which was filed on Nov. 24, 2004.

U.S. Appl. No. 11/082,710 to Kobayshi et al., which was filed on Mar. 18, 2005.

English Language Abstract of KR 2004-0028333.

English Language Abstract of KR 2003-0022448.

* cited by examiner

| Enum Domain Name | | Order | Preference | Flags | Service | | URI scheme | |
|---|---|---|---|---|---|---|---|---|
| | | | | | | | | URI |
| 0.0.0.0.0.0.0.1.3.1.8.e164.arpa | IN NAPTR | 100 | 10 | "u" | "E2U+sip" | "!^.*$!sip:" | | 81310000000@tokyo.enumisp.jp" |
| 1.0.0.0.0.0.0.1.3.1.8.e164.arpa | IN NAPTR | 100 | 10 | "u" | "E2U+sip" | "!^.*$!sip:" | | 81310000001@tokyo.enumisp.jp" |
| | IN NAPTR | 200 | 10 | "u" | "E2U+tel" | "!^.*$!tel:" | | 81310000001;svc=voice |
| 3.0.0.0.0.0.0.1.3.1.8.e164.arpa | IN NAPTR | 100 | 10 | "u" | "E2U+sip" | "!^.*$!sip:" | | 81310000003@tokyo.enumisp.jp" |

NAPTR resource record

IP TELEPHONE SYSTEM, IP TELEPHONE APPARATUS AND CALLING METHOD

BACKGROUND OF THE INVENTION

1. Field of the Invention

The present invention relates to an IP telephone system, an IP telephone apparatus and a calling method via an IP network.

2. Description of Related Art

Recently, the Internet has rapidly spread, and then an IP telephone apparatus that allows voice communication via an IP network (hereafter referred to as IP telephone) has rapidly grown as well. However, the rapid growth of IP telephones causes a problem that no communication can be established although a media stream is established. Thus, it has been proposed to create a technology which avoids this problem (see Prior Art 1). The proposal is to solve problems which can occur because an IP network is congested. While the IP network is congested, CA (Call Agent) on an IP network inevitably bears a heavier workload. Therefore, it is currently requested to reduce the workload for CA on an IP network.

Figure 9:
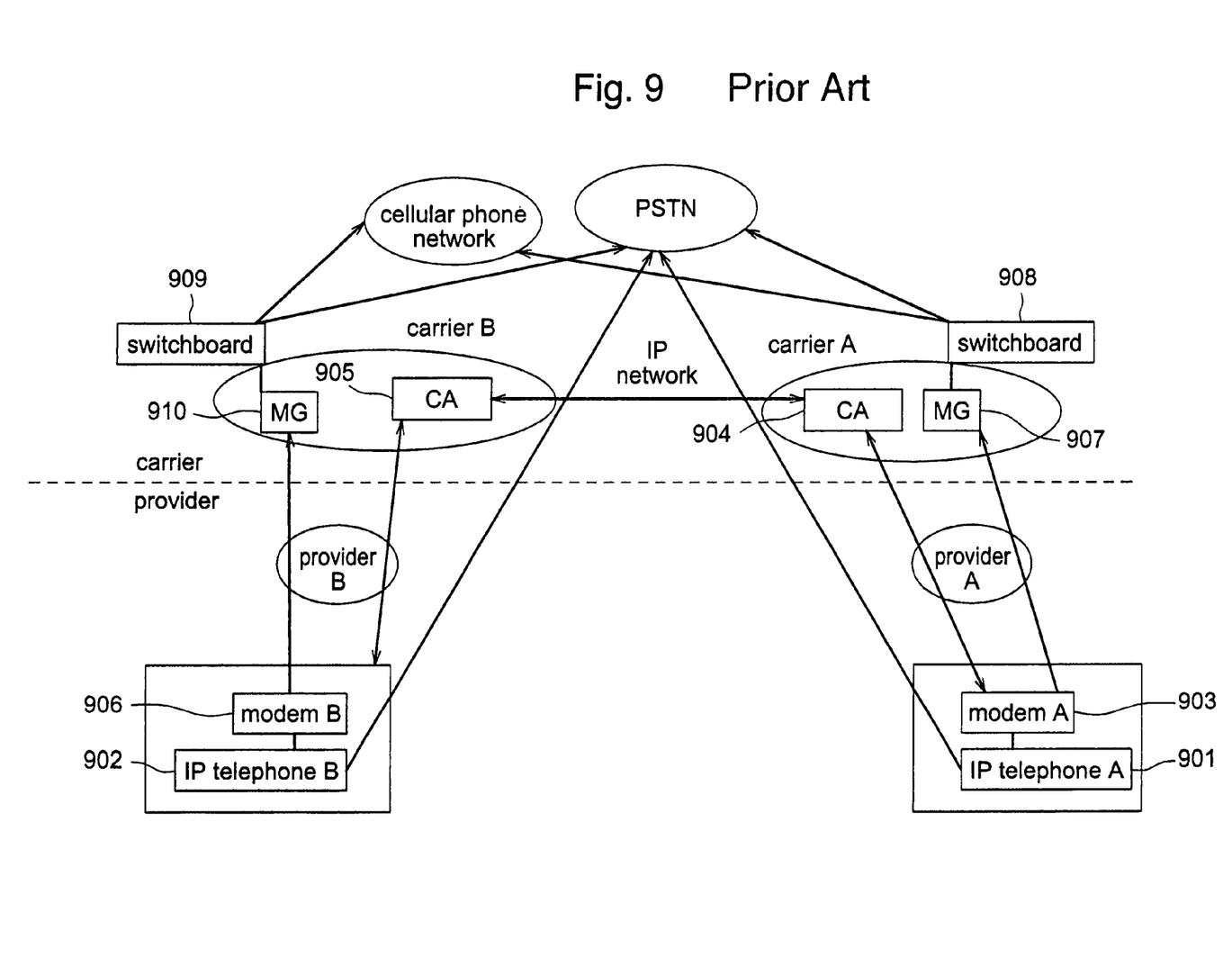
FIG. 9 illustrates a diagram that describes a communication network used for a conventional IP telephone.

FIG. 9 illustrates a communication network used for a conventional IP telephone system. In the following, a communication network between IP telephone A901 and IP telephone B902 shown in FIG. 9 is described.

In FIG. 9, IP telephone A901 and IP telephone B902 are using different providers and managed by CAs which are owned by different carriers. IP telephone A901 and IP telephone B902 have functions that enable voice communication via an IP network and a Public Switched Telephone Network (hereafter referred to as PSTN). CA also has SIP (Session Initiation Protocol) server functions.

When IP telephone A901 communicates with IP telephone B902, communication is established via the IP network or the PSTN.

When communicating via the IP network, IP telephone A901 transmits, to CA 904 owned by carrier A, the message "INVITE" which includes information regarding the destination terminal (IP telephone B902) via modem A 903. CA 904 searches for another CA that manages the destination terminal, since CA 904 does not manage the destination terminal. As a result of the search, CA 905 that is owned by carrier B is found, and the aforesaid message "INVITE" is transmitted from CA 904 to CA 905. CA 905 transmits the message "INVITE" to IP telephone B902. IP telephone B902 receives the message "INVITE" via modem B 906. When IP telephone B902 receives the message "INVITE", messages specified by SIP are exchanged between IP telephone A901 and IP telephone B902. Then, the two telephones are ready to communicate.

On the other hand, when communicating via the PSTN, IP telephone A901 inputs the telephone number of IP telephone B902 and places a call to IP telephone B902. Then, IP telephone B902 receives a call from IP telephone A901 via the PSTN. When the receiver of IP telephone B902 is picked up, IP telephone A901 and IP telephone B902 are connected, and the two telephones are ready to communicate.

FIG. 9 also shows a communication network between IP telephone A901 and a terminal apparatus on a cellular phone network or the PSTN. In this example, voice date received from IP telephone A901 is converted, at MG (Media Gateway) 907, into a data format necessary for communication via the PSTN or the cellular phone network. Then, the converted data is transmitted to the PSTN or the cellular phone network via switchboard 908.

When communication is attempted via the IP network and when there are some problems occurred within the IP network, CA 904 establishes communication via networks other than the IP network. For example, when communication is attempted via the PSTN, voice data received from IP telephone A901 is transmitted to the PSTN via MG 907 and switchboard 908 as described above. Then, voice data is transmitted to IP telephone B902 via switchboard 909 and MG 910 of carrier B.

Figure 10:
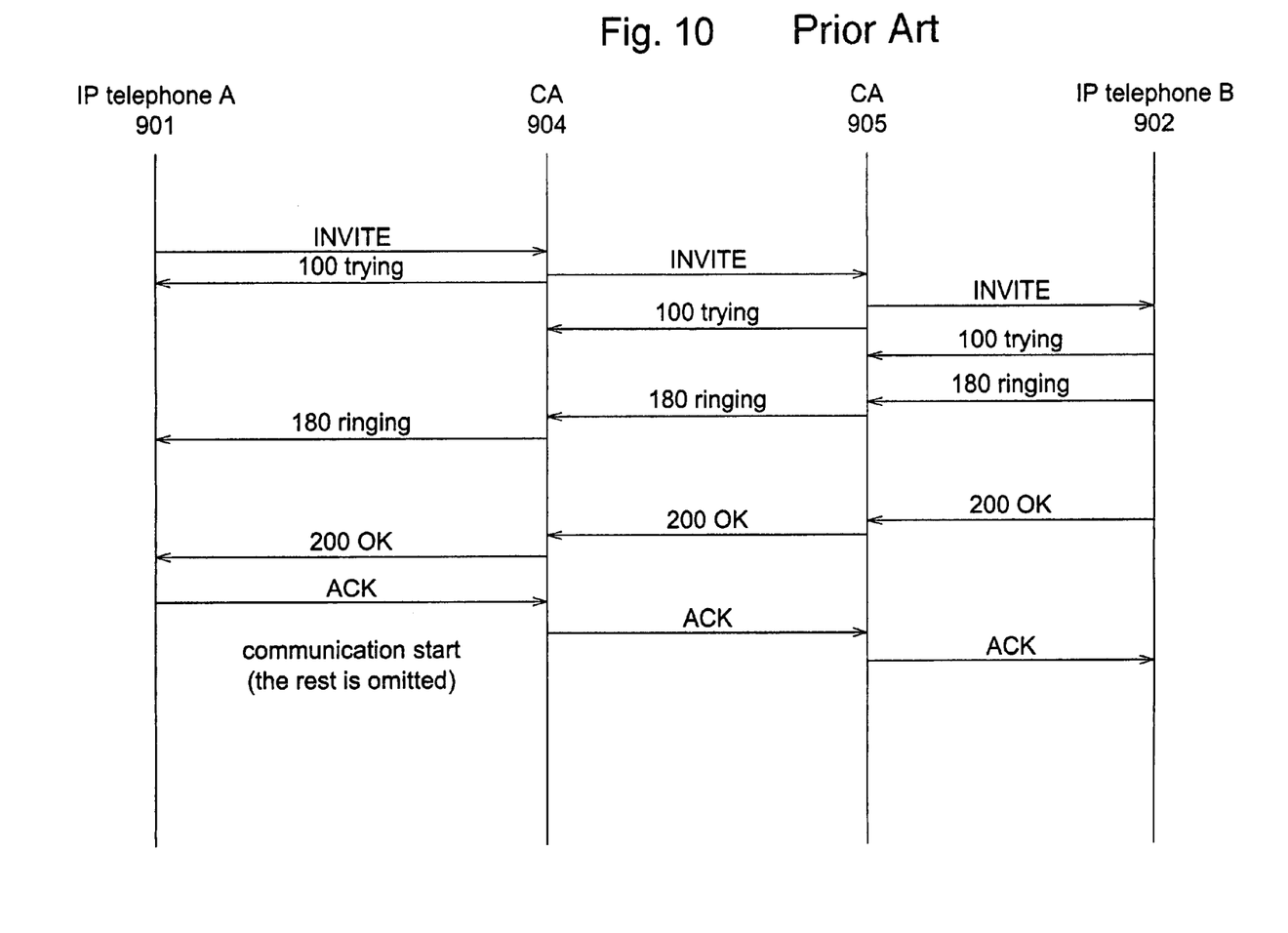
FIG. 10 illustrates a sequence diagram that describes communication performed via a conventional IP network.

FIG. 10 is a sequence diagram to illustrate a communication network via the IP network.

When IP telephone A901 places a call, the message "INVITE" is transmitted to CA 904. CA 904 transmits the message "INVITE" to CA 905. At the same time, CA 904 transmits the message "100 trying" to IP telephone A901. Similarly, CA 905 transmits the message "INVITE" to IP telephone B902. At the same time, CA 905 transmits the message "100 trying" to CA 904.

Upon receiving the message "INVITE", IP telephone B902 transmits, to CA 905, the message "100 trying" and then the message "180 Ringing". At the same time as transmitting the message "180 Ringing", IP telephone B902 sounds a receiving tone. CA 905 transmits the message "180 Ringing" to CA 904. CA 904 transmits the message "180 Ringing" to IP telephone A901. IP telephone A901 then sounds a ringing tone in response to the message "180 Ringing".

When it is determined, through the receiving tone, that the receiver of IP telephone B902 is picked up, IP telephone B902 transmits, to CA 905, the message "200 OK" to indicate a connection approval. CA 905 transmits the message "200 OK" to CA 904. CA 904 transmits the message "200 OK" to IP telephone A901.

Upon receiving the message "200 OK", IP telephone A901 transmits the message "Acknowledge (hereafter referred to as ACK)" to CA 904. CA 904 transmits the message "ACK" to CA 905. CA 905 transmits the message "ACK" to IP telephone B902. When IP telephone B902 receives the message "ACK", IP telephone A901 and IP telephone B902 are ready to communicate via the IP network.

[Related Art 1]

Japanese Patent Laid Open Publication 2003-333106

However, when communicating via the IP network as described above, CA needs to relay all the messages, such as "INVITE" or "200 OK", to destination terminals or other CAs. This puts an excessive workload on CA and will thus become a more serious problem in the future with the growth of IP telephones.

Also, when communication is attempted via the PSTN and when the calling terminal does not store information regarding whether communication can be established with the destination terminal via the PSTN, predetermined signals (e.g., SIP "INVITE" message) are transmitted to CA when calls are placed. Thus, CA handles all the signals transmitted via the PSTN as well as the IP network, which puts an excessive workload on CA.

The above-described problems can be solved by improving CA's process capacities. However, this requires significant costs, and the users may have to bear the cost. This can lead to hinder the diffusion of IP telephone systems.

SUMMARY OF THE INVENTION

The present invention is provided to address the above-described problems. The objectives of the present invention are to both reduce the workload for CA on an IP network and provide an IP telephone system, an IP telephone apparatus and a calling method that facilitate the further development of IP telephone systems without requiring significant costs.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the serveral views of the drawings, and wherein.

DETAILED DESCRIPTION OF PREFERRED EMBODIMENTS

The embodiments of the present invention are explained in the following, in reference to the above-described drawings.

Figure 1:
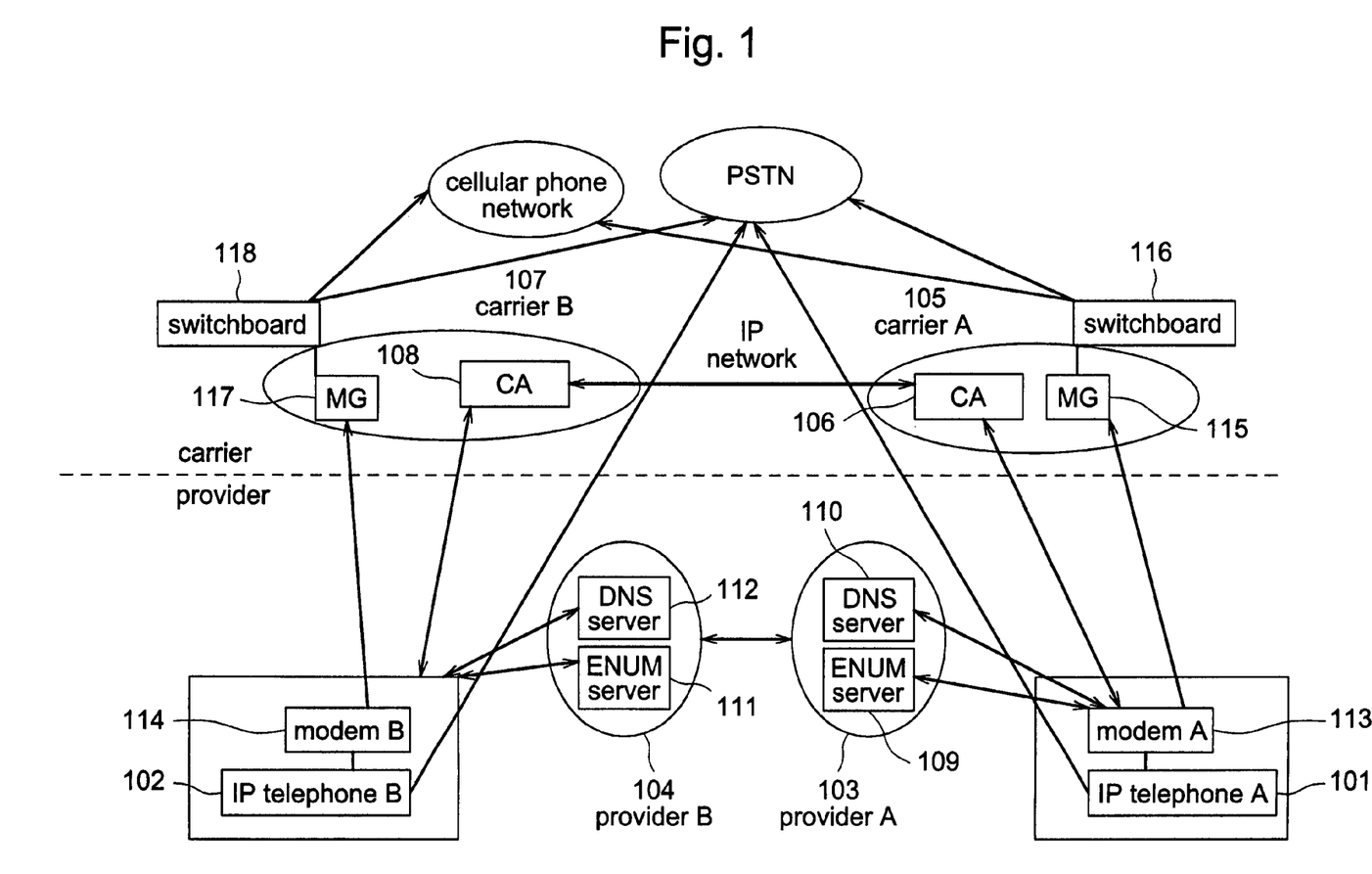
FIG. 1 illustrates a configuration of a network to which the IP telephone system according to an embodiment of the present invention applies.

FIG. 1 illustrates a configuration of a network to which the IP telephone system according to the first embodiment of the present invention applies.

FIG. 1 shows a network configuration necessary to establish communication between IP telephone A101 and IP telephone B102 that use different providers. IP telephone A101 uses provider A103; IP telephone B102 uses provider B104. Also, providers A and B are connected via the IP network. IP telephones A101 and B102 have functions which enable voice communication via the IP network or the PSTN.

Also, IP telephone A101 and IP telephone B102 are managed by IP telephone management servers, which are CAs, owned by different carriers. IP telephone A101 is managed by CA 106, which is owned by carrier A105; IP telephone B102 is managed by CA 108, which is owned by carrier B107. CA 106 and CA 108 manage voice communication between IP telephone A101 and IP telephone B102 via the IP network. Also, CA 106 and CA 108 have SIP (Session Initiation Protocol) server functions.

Provider A103 includes a terminal apparatus that functions as ENUM (E. 164 telephone Number Mapping) server 109 and DNS (Domain Name System) server 110. For example, ENUM server 109 or DNS server 110 can be configured as a personal computer (hereafter referred to as PC) equipped with a software which can manage a database. Provider B104, as well as provider A103, comprises ENUM server 111 and DNS server 112. Either the ENUM server or the DNS server can be configured to have both functions.

In the IP telephone system according to the present embodiment, communication is attempted between IP telephone A101 and IP telephone B102 via the IP network or the PSTN as described in FIG. 1. Further, in the IP telephone system according to the present embodiment, communication may be attempted via a network structured on the IP network (hereafter referred to as ENUM network) which enables voice communication on the IP network based on NAPTR resource records. NAPTR resource records are provided by the ENUM server owned by the provider. In the following, IP network refers to a network that performs voice communication between IP telephones managed by CAs, which are owned by carriers. On the other hand, ENUM network refers to a network that performs voice communication between IP telephones based on NAPTR resource records provided by the ENUM server.

When communication is attempted via the IP network, IP telephone A101 transmits, to CA 106, the message "INVITE" which includes information regarding the destination terminal (IP telephone B102) via modem A113. CA 106 searches for another CA that manages the destination terminal, since CA 106 does not manage the destination terminal. As a result of the search, CA 108 is found, and the aforesaid message "INVITE" is transmitted from CA 106 to CA 108. CA 108 transmits the message "INVITE" to IP telephone B102. IP telephone B102 receive the message "INVITE" via modem B114. After the message "INVITE" is received, messages specified by SIP are directly exchanged between IP telephone A101 and IP telephone B102. Then, the two telephones are ready to communicate.

On the other hand, when communication is attempted via the PSTN, IP telephone A101 input the telephone number of IP telephone B102 and places a call to IP telephone B102. Then, IP telephone B102 receives the call from IP telephone A101 via the PSTN. When the receiver of IP telephone B102 is picked up, IP telephone A101 and IP telephone B102 are connected. Then, the two telephones are ready to communicate.

When communication is attempted via the PSTN, the calling telephone, IP telephone A 101, in principle, needs to be set not to transmit a request to the ENUM server. When such a setup is not provided, IP telephone A101 transmits, to ENUM server 109, a request for a NAPTR resource record, which is later described.

When communication is attempted via the ENUM network, IP telephone A101 transmits, to ENUM server 109, a request for NAPTR resource record(s) of the destination terminal (IP telephone B102). When NAPTR resource record(s) register(s) SIP as a compatible service, IP telephone A101 transmits the message "INVITE" to IP telephone B102. After IP telephone B102 receives the message "INVITE", messages specified by SIP are exchanged between IP telephone A101 and IP telephone B102. Then, the two telephones are ready to communicate. A detailed description of a communication process via the ENUM network is later provided.

FIG. 1 also illustrates a communication network between IP telephone A 101 (IP telephone B 102) and a terminal on the cellular phone network or the PSTN. In this example, voice date received from IP telephone A101 is converted, at MG (Media Gateway) 115, into a data form necessary for communication via the PSTN or the cellular phone network. Then, the converted data is transmitted from MG 115 to the PSTN or the cellular phone network via switchboard 116.

When communication is attempted between IP telephone A101 and IP telephone B102 via the IP network and when there are some problems occurred within the IP network, CA 106 (108) establishes communication via networks other than the IP network. For example, when communication is attempted via the PSTN, voice data received from IP telephone A101 (IP telephone B102) is transmitted, as described above, to the PSTN via MG 115 (MG 117) and switchboard 116 (switchboard 118). Then, voice data is transmitted to IP telephone B102 (IP telephone A101) via switchboard 118 (switchboard 116) (carrier A105) and MG 117 (MG 116) of carrier B107.

Figure 2:
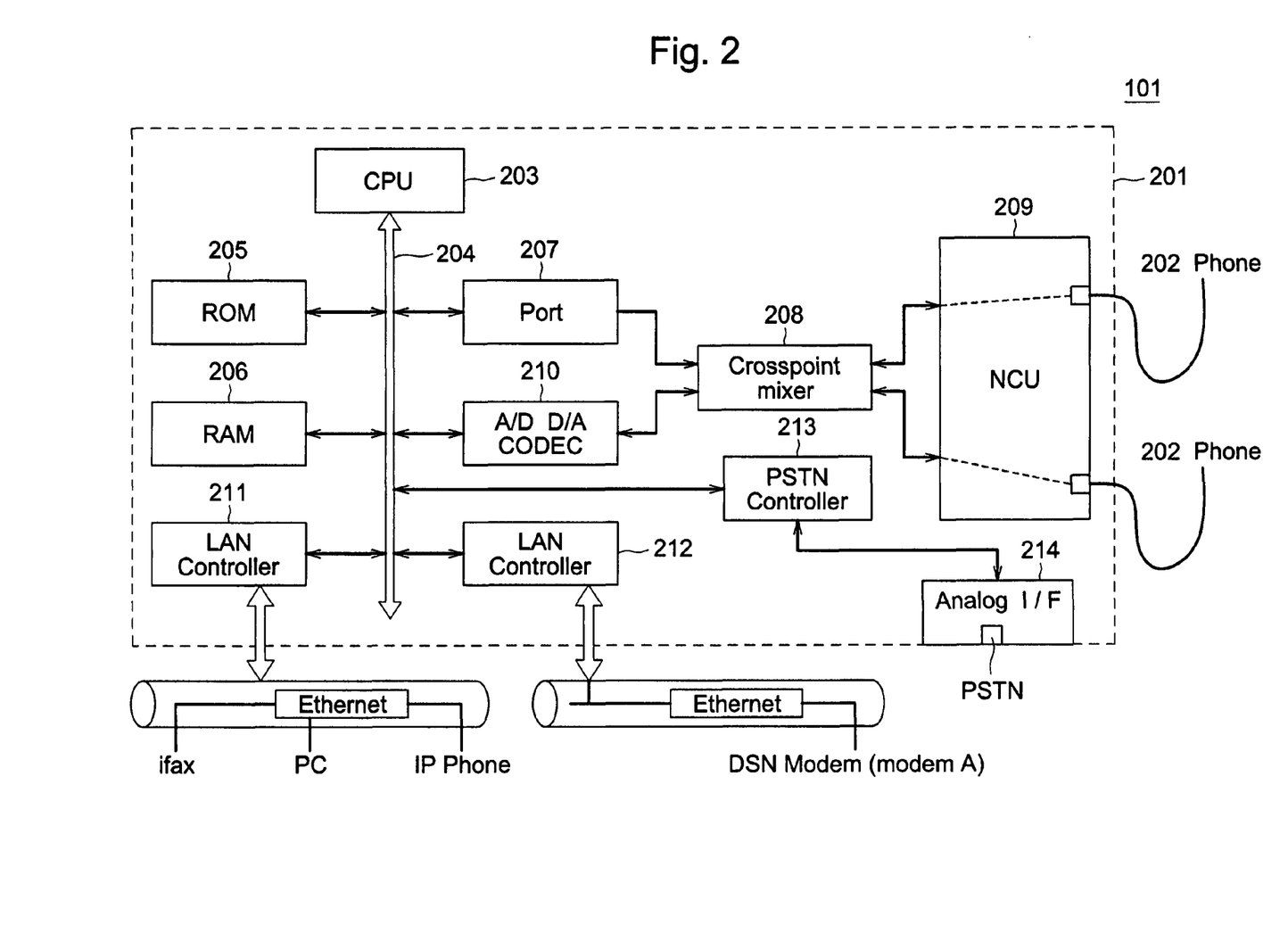
FIG. 2 illustrates a block diagram to describe a configuration of IP telephone A that structures the IP telephone system according to the embodiment of the present invention.

FIG. 2 illustrates a block diagram that describes a configuration of IP telephone A101 that structures the IP telephone system according to the present embodiment. IP telephone B102 has the same configuration.

As shown in FIG. 2, IP telephone A101 according to the present embodiment is configured to connect control adapter 201 to ordinary telephone 202. In this example, an ordinary telephone is a telephone that has no functions to make voice communication via the IP network and can only be communicated via the PSTN. Control adapter 201 according to the present embodiment can be configured to connect two ordinary telephones 202 and to function each telephone as an IP telephone. Of course, control adapter 201 can be configured to connect more than three telephones.

Control adapter 201 includes CPU 203 that controls the entire operation of the apparatus. ROM 205 and RAM 206 are connected to CPU 203 via control bus 204. ROM 205 stores a control program of control adapter 201, which CPU 203 retrieves and executes. RAM 206 functions as a work memory when CPU 203 executes the control program. Control adapter 201 uses a flash ROM as ROM 205 and uses SDRAM as RAM 206.

Crosspoint mixer 208 is connected to CPU 203 via port 207. Crosspoint mixer 208 has switching and mixing functions of talk lines for two telephones connected via an NCU, which is later described.

NCU (Network Control Unit) 209 is connected to crosspoint mixer 208. NCU 209 connects and terminates a line with the opposite party by controlling telephone lines connected to control adapter 201.

Further, A/D·D/ACODEC 210 is connected to CPU 203 via control bus 204. A/D·D/ACODEC 210 performs an analog/digital conversion of voice data, which is input from telephone 202, and compresses the converted data. On the other hand, after the converted data received via a LAN controller, which is later described, is decompressed, a digital/analog conversion is performed to the decompressed data.

LAN controller 211 and LAN controller 212 are connected to CPU 203 via controller bus 204. LAN controller 211 controls signals exchanged between IP telephones and PCs or other devices connected via Ethernet (R). Ethernet (R) structures a network to which control adapter 201 is connected. Also, LAN controller 211 assembles and analyzes packet data transmitted on a network. LAN controller 212 controls signals exchanged between the IP network and control adapter 201 and between the ENUM network and control adapter 201 via a DSL modem (modem A), which is connected to control adapter 201 via Ethernet (R).

PSTN controller 213 is connected to CPU 203 via controller bus 204. PSTN controller 213 controls signals exchanged between control adapter 201 as described above and the PSTN via analog interface (I/F) 214.

When IP telephone A101 comprises the above configuration, instead of connecting an ordinary telephone to control adapter 201, a control board having the functions of control adapter 201 is installed in IP telephone A101.

Figure 3:
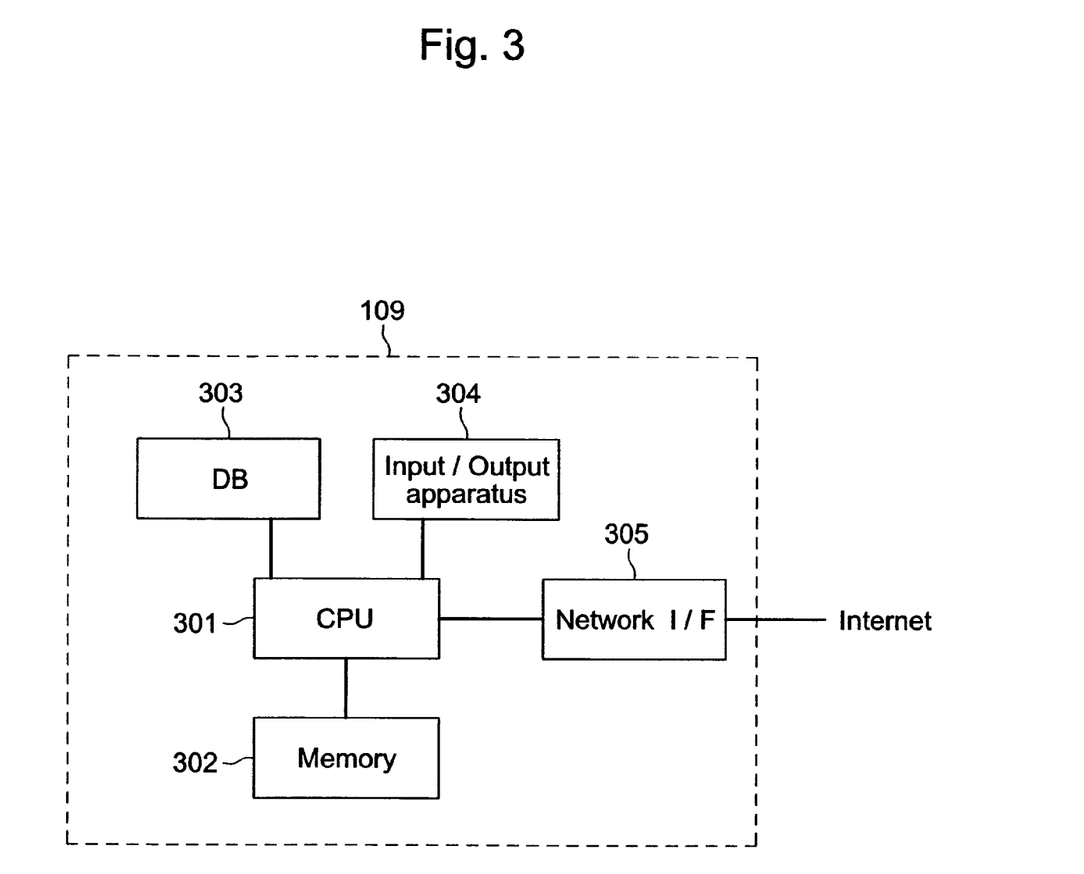
FIG. 3 illustrates a configuration of an ENUM server that structures the IP telephone system according to the embodiment of the present invention.

FIG. 3 illustrates a configuration of ENUM server 109 that structures the IP telephone system according to the present embodiment. ENUM server 111 has the same configuration.

As shown in FIG. 3, ENUM server 109 includes CPU 301 that controls the entire operation of the server. Memory 302 is connected to CPU 301. Memory 302 has ROM functions and RAM functions: ROM that stores the control program of ENUM server 109, which CPU 301 retrieves and executes, and RAM that functions as a work memory when CPU 301 executes the control program.

Data Base (DB) 303 is connected to CPU 301. DB 303 stores NAPTR resource records, which are later described. When CPU 301, for example, receives, from IP telephone A101, a request based on standard E. 164, CPU 301 searches for corresponding NAPTR resource record(s) among data stored in DB 303 and returns corresponding NAPTR resource record(s) to IP telephone A101, which made the request.

Input/output apparatus 304 is connected to CPU 301. Input/output apparatus 304, for example, comprises an input apparatus such as a keyboard and an output apparatus such as a display. An input apparatus, for example, is used to add and edit data stored in DB 303. An output apparatus, for example, is used by administrators of ENUM server 109 to confirm data stored in DB 303.

Network Interface (I/F) 305 is connected to CPU 301. Network I/F 305 is an interface to connect ENUM server 109 to the Internet.

Figure 4:
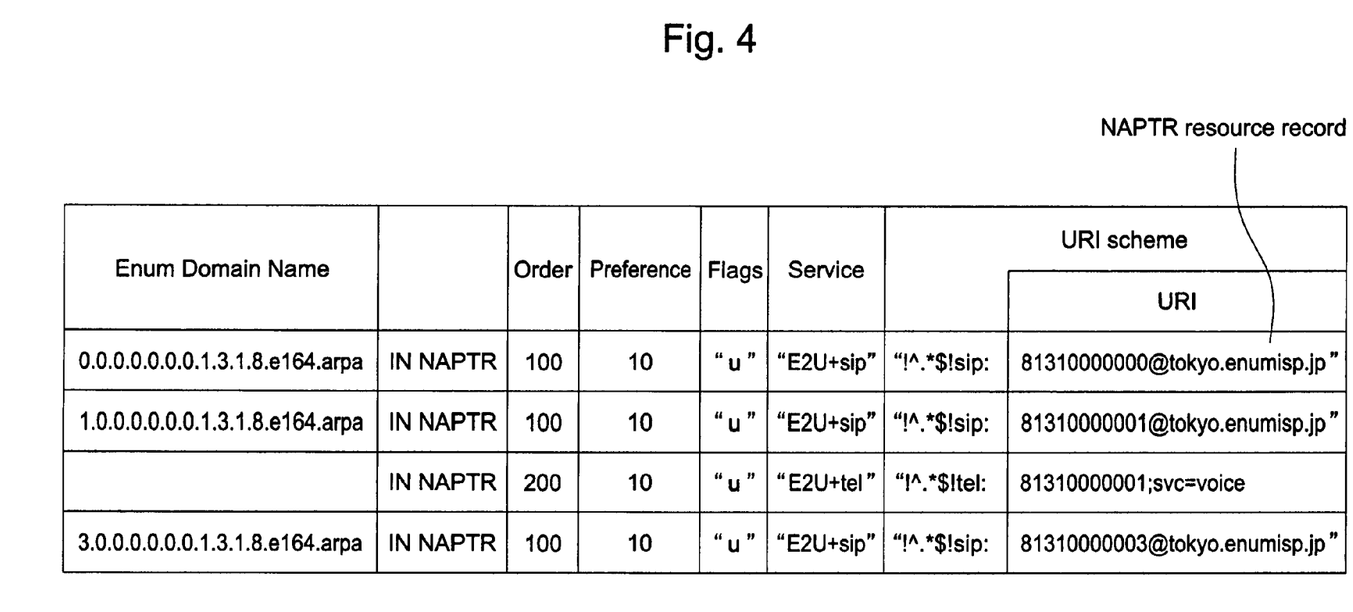
FIG. 4 illustrates an example of NAPTR resource records stored in DB of the ENUM server according to the embodiment of the present invention.

FIG. 4 illustrates an example of NAPTR resource records stored in DB 303 of ENUM server 109 according to the present embodiment. In FIG. 4, DB 303 stores all NAPTR resource records including NAPTR resource record(s) that correspond(s) to IP telephone B102 shown in FIG. 1. Telephone number "0310000001" corresponds to IP telephone B102.

In FIG. 4, DB 303 stores NAPTR resource record(s) that correspond(s) to domain name which is obtained from telephone numbers "0310000000", "0310000001" and "0310000003". In FIG. 4, URI "81310000000@tokyo.enumisp.jp" corresponds to domain name "0.0.0.0.0.0.0.1.3.1.8.e164.arpa" obtained from telephone number "0310000000". URI "81310000003@tokyo.enumispjp" corresponds to domain name "3.0.0.0.0.0.0.1.3.1.8.e164.arpa" obtained from telephone number "0310000003".

Further, two URIs "81310000001@tokyo.enumispjp" and "81310000001; svc=voice" correspond to domain name "1.0.0.0.0.0.0.1.3.1.8.e164.arpa" obtained from telephone number "0310000001". Therefore, DB 303 stores two NAPTR resource records that correspond to IP telephone B102.

Of these two NAPTR resource records, the NAPTR resource record in the top row contains "100" in the order filed. Also, "E2U+SIP", which indicates compatibility with SIP, is contained in the service field. On the other hand, the NAPTR resource record in the second top row contains "200", which indicates a lower priority than "100", in the order field. Also, "E2U+tel", which indicates that communication can be established via the PSTN, is contained in the service field.

Figure 5:
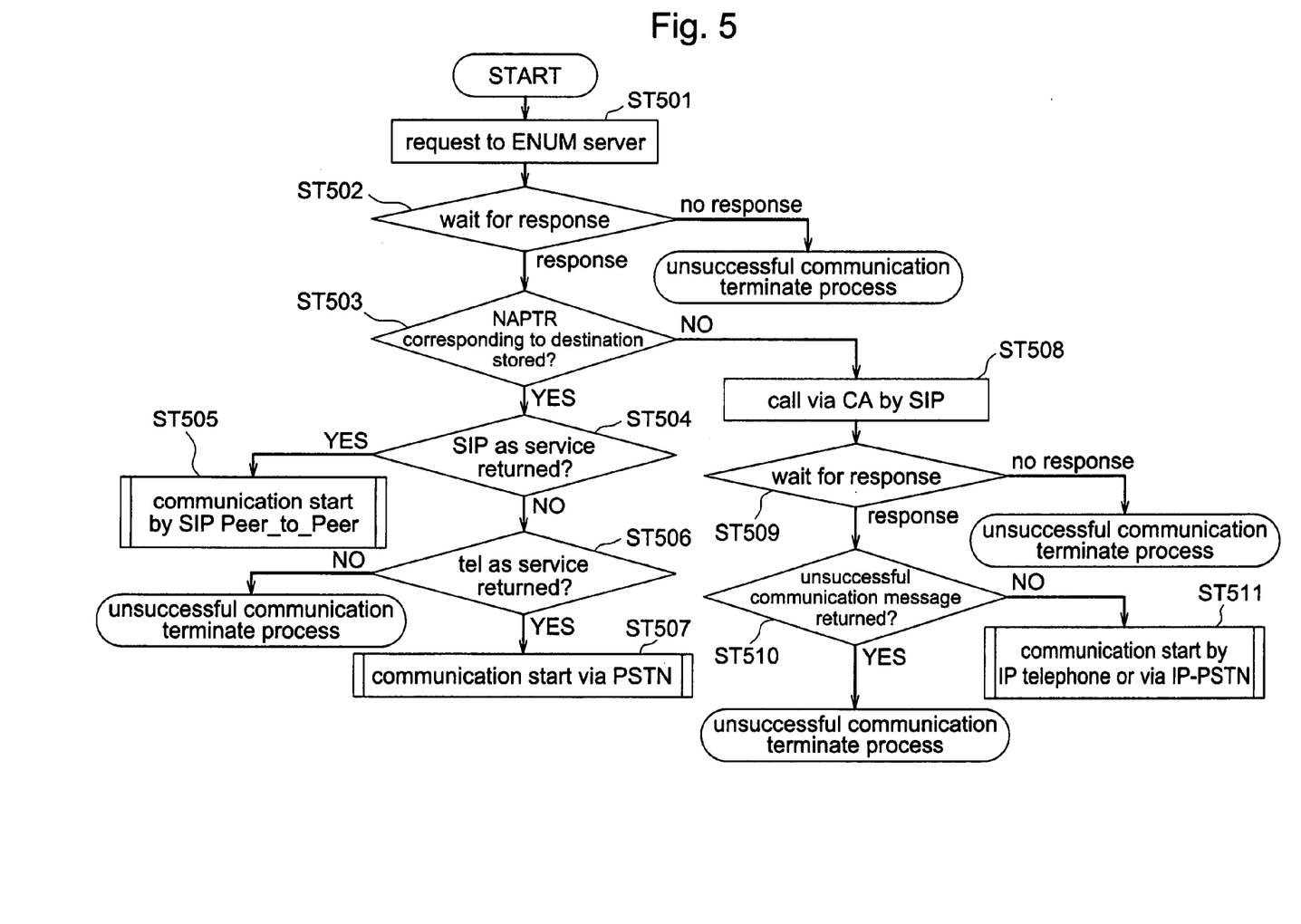
FIG. 5 illustrates a flow chart that describes an operation where IP telephone A places a call to IP telephone B in the IP telephone system according to the embodiment of the present invention.

FIG. 5 is a flow chart that describes an operation where IP telephone A101 places a call to IP telephone B102 in the IP telephone system according to the present embodiment. When the processes shown in FIG. 5 start, DB 303 of ENUM server 109 needs to store the NAPTR resource records described in FIG. 4.

When IP telephone A101 places a call to IP telephone B102, the telephone number of IP telephone B102 is input by the operator of IP telephone A101, and then a call-placement instruction is made. More specifically, telephone number "0310000001" or "10000001" with "03" omitted is input, and then a call-placement instruction is made.

After receiving the telephone number and then a call-placement instruction, IP telephone A101 transmits, to ENUM server 109, a request for NAPTR resource record(s) that correspond(s) to the telephone number (ST 501). More specifically, IP telephone A101 converts the operator's input number "0310000001" into "+81-3-10000001" including the country code according to standard E. 164. Then, "+81310000001" is obtained, with + at the beginning, followed by the numbers. Then, non numerical symbols are deleted, and dots are inserted between the numbers, resulting in "8.1.3.1.0.0.0.0.0.1". Next, the numbers are reversed, and a string e164.arpa is added at the end. As a result, domain name "1.0.0.0.0.0.0.1.3.1.8. e164.arpa" is obtained. IP telephone A101 then transmits, to ENUM server 109, a request for NAPTR resource record(s) that correspond(s) to the string.

IP telephone A101 waits for a response from ENUM server 109 (ST 502). When there is no response, IP telephone A101 determines that the communication is unsuccessful and terminates the process. For example, no response is obtained when there is a communication line failure. On the other hand, DB 303 stores NAPTR resource record(s) that correspond(s) to IP telephone B102. Therefore, IP telephone A101 receives a response.

When there is a response, it is determined that NAPTR resource record(s) that correspond(s) to the destination terminal is(are) stored (ST 503). DB 303 stores the NAPTR resource records that correspond to string "1.0.0.0.0.0.0.1.3.1.8.e164.arpa", which corresponds to the telephone number of IP telephone B102. Therefore, it is determined that the NAPTR resource records corresponding to the destination terminal are stored.

When it is determined that the NAPTR resource records corresponding to the destination terminal are stored, it is determined whether SIP is returned as a compatible service (ST 504). More specifically, it is determined whether SIP (E2U+sip) is contained in the service filed of the NAPTR resource records. The NAPTR resource records that correspond to string "1.0.0.0.0.0.0.1.3.1.8.e164.arpa" contain SIP in the top row of the service field. Therefore, it is determined that SIP is returned as a compatible service.

When it is determined that SIP is returned as a compatible service, IP telephone A101 starts communication using SIP Peer_to_Peer (ST 505). Accordingly, communication is directly performed between IP telephone A101 and IP telephone B102 via the ENUM network shown in FIG. 1 in accordance with the protocol specified by SIP.

When it is determined that SIP is not returned as a compatible service at ST 504, it is then determined whether tel is returned as a compatible service (ST 506). Tel indicates that communication can be established via the PSTN. More specifically, it is determined the corresponding NAPTR resource records contain tel (E2U+tel) in the service field. The NAPTR resource records that correspond to string "1.0.0.0.0.0.0.1.3.1.8.e164.arpa" contain tel in the second top row of the service field. When no communication can be established for a certain reason, this NAPTR resource record including tel is returned. Therefore, in this case, it is determined that tel is returned as a compatible service at ST 506. On the other hand, when it is determined that tel is not returned as a compatible service at ST 506, IP telephone A101 determines that the communication is unsuccessful and terminates the process.

When it is determined that tel is returned as a compatible service at ST 506, IP telephone A101 starts communication via the PSTN (ST 507). Accordingly, communication is directly performed between IP telephone A101 and IP telephone B102 via the PSTN shown in FIG. 1.

When it is determined, at ST 503, that NAPTR resource record(s) corresponding to the destination terminal is(are) not stored, IP telephone A101 places a call via CA 106 in accordance with the protocol specified by SIP (ST 508). More specifically, IP telephone A101 transmits, to CA 106, the message "INVITE" which includes information regarding the destination terminal. However, when the NAPTR resource records shown in FIG. 4 are stored, the process does not proceed to the following step.

When IP telephone B102 is the destination terminal, CA 106 transmits, to CA 108, the message "INVITE" as described above, since CA 106 does not manage IP telephone B102. IP telephone B102 receives the message "INVITE" from CA 108 and returns a response message to IP telephone A101 via CA 108 and CA 106.

At ST 509, IP telephone A101 waits for a response from CA 106. When there is no response from CA 106, IP telephone A101 determines that the communication is unsuccessful and terminates the process. In the same way as ST 502, for example, no response is obtained when there is a communication line failure.

On the other hand, when there is a response from CA 106, it is determined whether a message is returned (ST 510). The message indicates that it is unsuccessful to establish communication with the destination terminal. For example, when three digit message beginning with one of the numbers "4", "5" or "6", i.e. "4", "5" or "6**" is returned, it is determined whether it includes the message indicating that it is unsuccessful to establish communication with the destination terminal. When it is determined such a message is returned, IP telephone A101 determines that the communication is unsuccessful and terminates the process.

When it is determined that a message other than the one which indicates that it is unsuccessful to establish communication with the destination terminal, for instance, a message such as "180 Ringing" is returned, IP telephone A101 starts communication using the IP network via CA (IP telephone), or communication through the IP network to the PSTN (IP-PSTN) (ST 511). Accordingly, communication is performed between IP telephone A101 and IP telephone B102 via the IP network shown in FIG. 1 in accordance with the protocol specified by SIP. Also, when no communication can be established between CA 106 and CA 108 for a certain reason, communication is performed via the PSTN.

In the following, descriptions are provided regarding sequences applying to each communication shown in FIG. 5.

Figure 6:
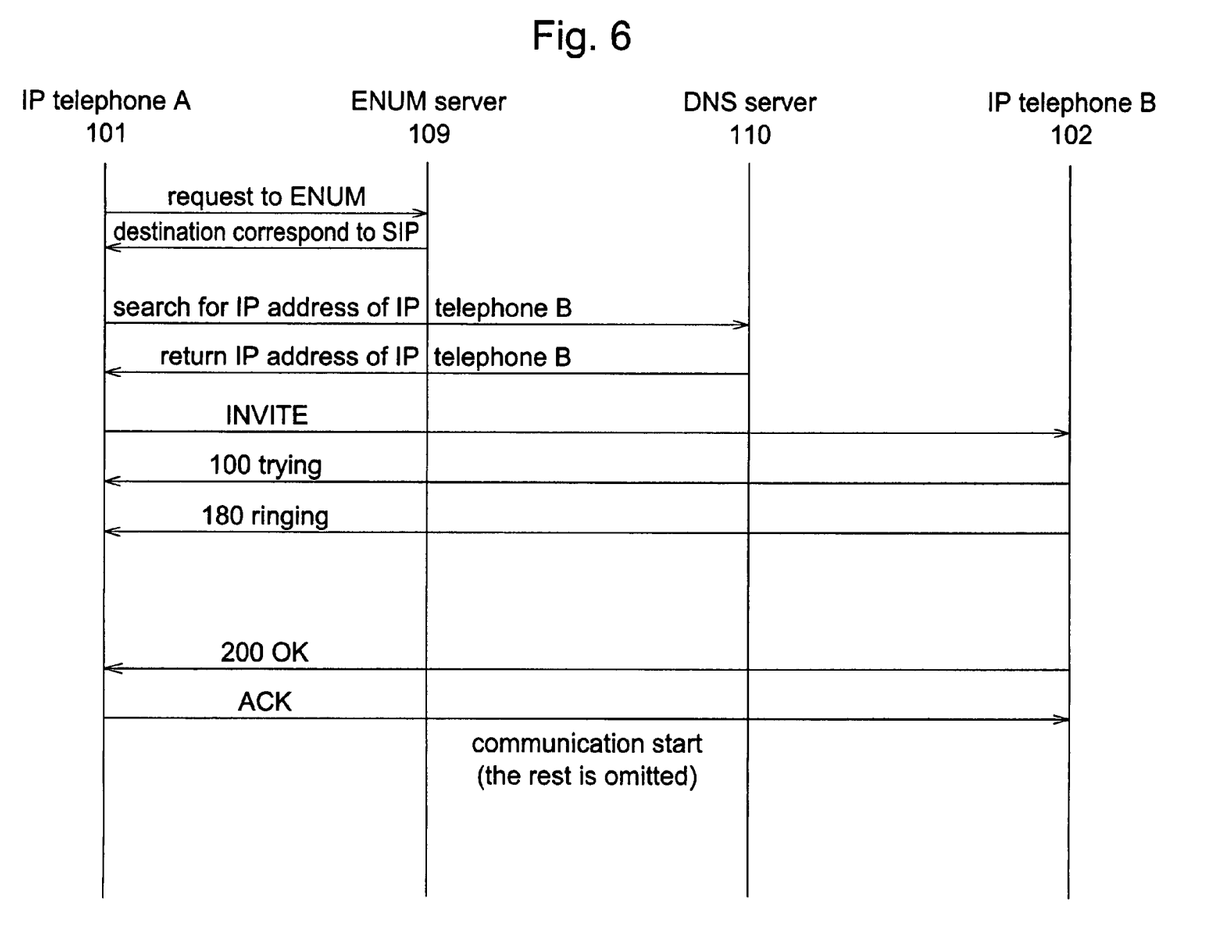
FIG. 6 illustrates a sequence diagram that describes communication performed between IP telephone A and IP telephone B via the ENUM network in the IP telephone system according to the embodiment of the present invention.
Figure 7:
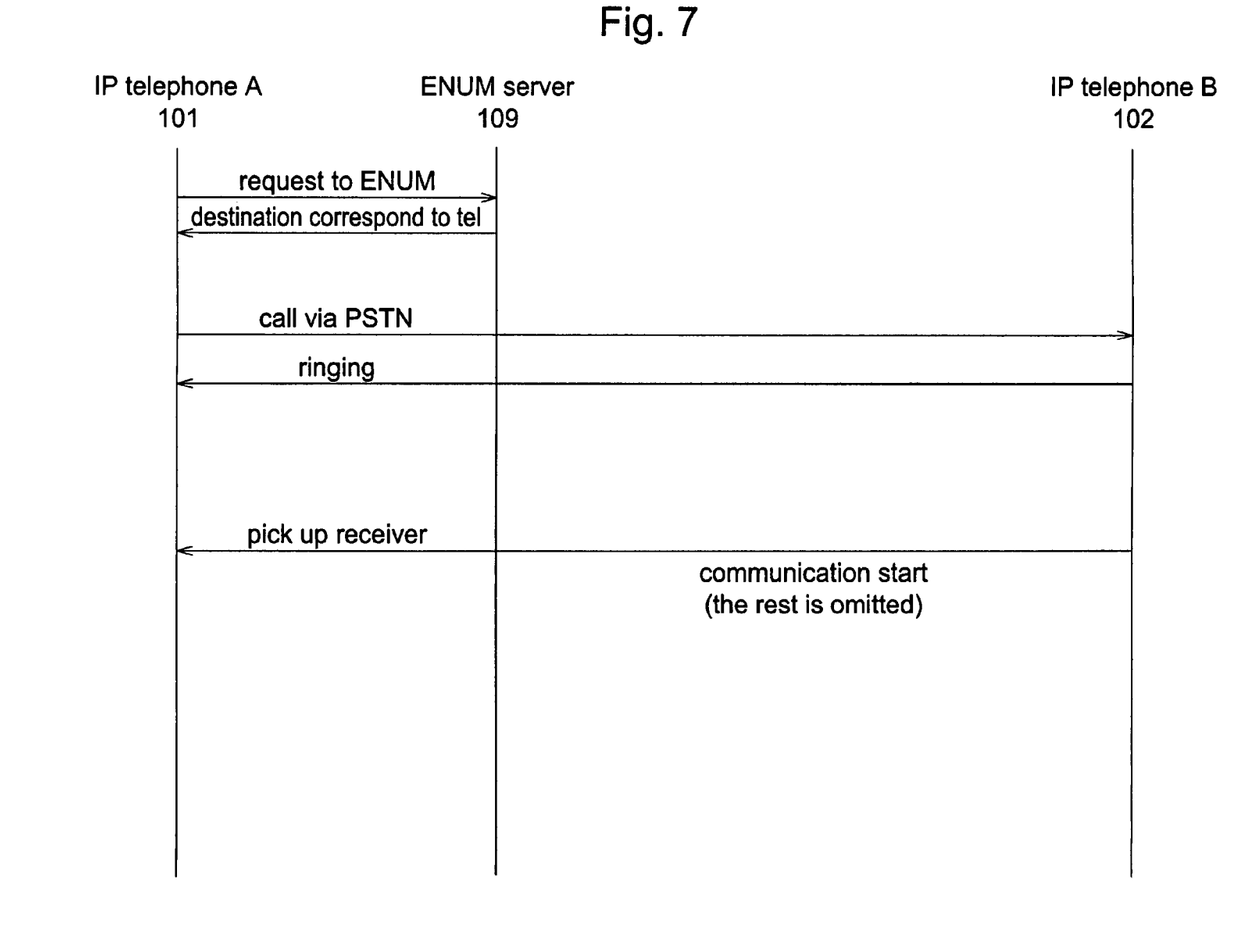
FIG. 7 illustrates a sequence diagram that describes communication performed between IP telephone A and IP telephone B via the PSTN in the IP telephone system according to the embodiment of the present invention.
Figure 8:
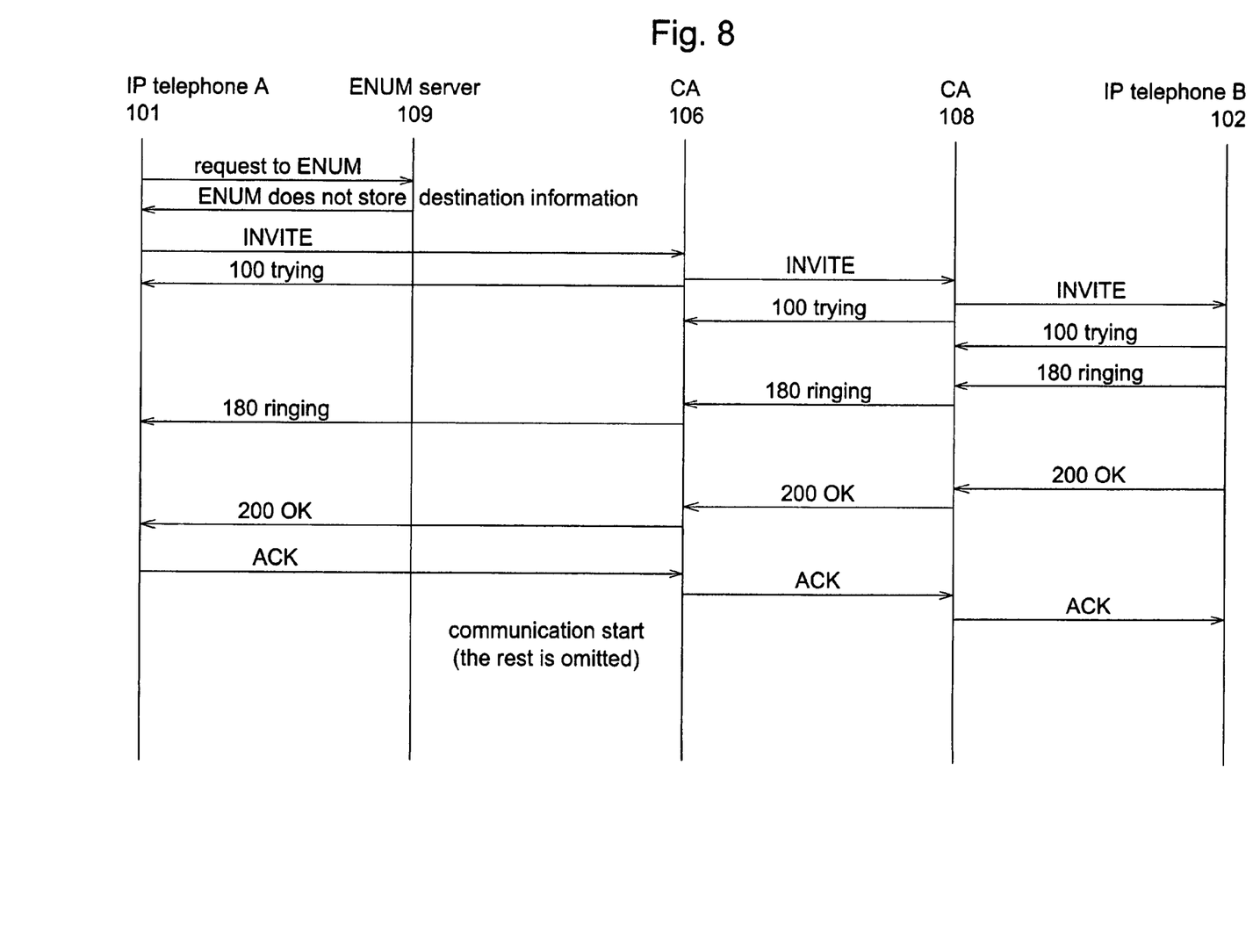
FIG. 8 illustrates a sequence diagram that describes communication performed between IP telephone A and IP telephone B via the IP network in the IP telephone system according to the embodiment of the present invention.

FIGS. 6-8 show sequence diagrams that describe communication performed between IP telephone A101 and IP telephone B102. FIG. 6 illustrates a sequence diagram that describes communication performed via the ENUM network shown in FIG. 1; FIG. 7 illustrates a sequence diagram that describes communication performed via the PSTN shown in FIG. 1; and FIG. 8 illustrates a sequence diagram that describes communication performed via the IP network shown in FIG. 1.

First, a communication sequence via the ENUM network is described with reference to FIG. 6.

As shown in FIG. 6, when IP telephone A101 places a call to IP telephone B102, IP telephone A101 first receives, from the operator, the telephone number of IP telephone B102 and transmits, to ENUM server 109, a request for NAPTR resource record(s) that correspond(s) to the telephone number. In this example, IP telephone B102 corresponds to SIP. Upon receiving the request from IP telephone A101, ENUM server 109 returns, to IP telephone A101, a NAPTR resource record which indicates that IP telephone B102 corresponds to SIP. IP telephone A101 receives the NAPTR resource record and also determines a URI that corresponds to IP telephone B102.

Upon receiving the NAPTR resource record, IP telephone A101 transmits, to DNS server 110, a search request for the IP address of IP telephone B102. More specifically, IP telephone A101 informs DNS server 110 of the URI that corresponds to IP telephone B102 and transmits, to DNS server 110, a request for the IP address that corresponds to the URI. After searching for the IP address of IP telephone B102, DNS server 110 informs IP telephone A101 of the IP address corresponding to the URI.

Upon receiving the IP address of IP telephone B102, IP telephone A101 directly transmits the message "INVITE" to the IP address of IP telephone B102 without accessing CA. The message is transmitted from IP telephone A 101 to provider A, to provider B and to IP telephone B102. Upon receiving the message "INVITE", IP telephone B102 transmits the message "100 trying" to IP telephone A101. After transmitting the message "100 trying", IP telephone B102 transmits the message "180 Ringing" to IP telephone A101. IP telephone B102 sounds a receiving tone at the same time as transmitting the message "180 Ringing". IP telephone A101 then sounds a ringing tone in response to the message "180 Ringing".

When it is determined that, through the receiving tone, for example, a hook-off condition is detected at the receiver of IP telephone B102, IP telephone B102 transmits, to IP telephone A101, the message "200 OK" to indicate a connection approval. Upon receiving the message "200 OK", IP telephone A101 transmits the message "ACK" to IP telephone B102. When IP telephone B102 receives the message "ACK", IP telephone A101 and IP telephone B102 are ready to communicate via the ENUM network shown in FIG. 1.

As described above, when communication is attempted via the ENUM network, messages specified by SIP are directly exchanged between IP telephone A101 and IP telephone B102. Thus, when the ENUM network is selected as the route of communication, CA 106 and CA 108 do not need to perform call management. This reduces the workload for CA 106 and CA 108.

When communication is attempted via the ENUM network, ENUM servers 109 and 111 bear a heavier workload while CAs 106 and 108 bear a lighter workload. However, ENUM servers 109 and 111 only need to return NAPTR resource record(s) in response to a request from the calling terminal, and calls are directly managed between the calling terminal and the destination terminal. Thus, unlike CAs 106 and 108, ENUM servers 109 and 111 do not perform call management. Therefore, ENUM servers 109 and 111 do not bear an excessive workload unlike CAs 106 and 108.

Next, a communication sequence via the PSTN is described with reference to FIG. 7.

As shown in FIG. 7, when IP telephone A101 places a call to IP telephone B102, IP telephone A101 first receives, from the operator, the telephone number of IP telephone B102 and transmits, to ENUM server 109, a request for NAPTR resource record(s) that correspond(s) to the telephone number. In this example, IP telephone B102 corresponds to tel which indicates that communication can be established via the PSTN. Upon receiving the request from IP telephone A101, ENUM server 109 returns, to IP telephone A101, a NAPTR resource record which indicates that IP telephone B102 corresponds to tel which indicates that communication can be established via the PSTN.

Upon receiving the NAPTR resource record, IP telephone A101 places a call to IP telephone B102 via the PSTN. A call is placed from IP telephone A101 to IP telephone B102 via the PSTN. In response to the call, IP telephone B102 transmits, to IP telephone A101, a ringing signal at the same time as sounding a receiving tone. IP telephone A101 sounds a ringing tone in response to the ringing signal.

When it is determined that, for example, the receiver of IP telephone B102 is picked up in response to the receiving tone, IP telephone B102 informs IP telephone A101 that the receiver of IP telephone B102 is picked up. At the same time, IP telephone A101 and IP telephone B102 are ready to communicate via the PSTN shown in FIG. 1.

As described above, when communication is attempted via the PSTN, IP telephone A101 first transmits, to ENUM server 109, a request for NAPTR resource record(s). When IP telephone B102 receives a NAPTR resource record which contains tel which indicates that communication can be established with IP telephone B102 via the PSTN, IP telephone A101 places a direct call to IP telephone B102 via the PSTN. Thus, even when IP telephone A101 does not store information which indicates that the destination terminal (IP telephone B102) performs communication via the PSTN, it will be avoided that IP telephone A101 transmits a predetermined signal to CA 106 (e.g., SIP "INVITE" message) when calls are placed. This reduces the workload for CA 106.

Next, a communication sequence using the IP network via CA with reference to FIG. 8 is described.

As shown in FIG. 8, when IP telephone A101 places a call to IP telephone B102, IP telephone A101 first receives, from the operator, the telephone number of IP telephone B102 and transmits, to ENUM server 109, a request for NAPTR resource record(s) that correspond(s) to the telephone number. In this example, NAPTR resource record(s) that correspond(s) to IP telephone B102 is(are) not stored. Upon receiving the request from IP telephone A101, ENUM server 109 transmits a response which indicates that NAPTR resource record(s) that correspond(s) to IP telephone B102 does(do) not exist.

Upon receiving the response which indicates such NAPTR resource record(s) does(do) not exist, IP telephone A101 transmits the message "INVITE" to CA 106. CA 106 transmits the message "INVITE" to CA 108. At the same time, CA 106 transmits the message "100 trying" to IP telephone A101. Similarly, CA 108 transmits the message "INVITE" to IP telephone B102. At the same time, CA 108 transmits the message "100 trying" to CA 106.

Upon receiving the message "INVITE", IP telephone B102 transmits, to CA 108, the message "100 trying" and then the message "180 Ringing". At the same time as transmitting the message "180 Ringing", IP telephone B102 sounds a receiving tone. Similarly, CA 108 transmits the message "180 Ringing" to CA 106. CA 106 transmits the message "180 Ringing"

to IP telephone A101. IP telephone A101 sounds a ringing tone in response to the message "180 Ringing".

When it is determined, through the receiving tone, that, for example, a hook-off condition is detected at the receiver of IP telephone B102, IP telephone B102 transmits, to CA 108, the message "200 OK" to indicate a connection approval. Similarly, CA 108 transmits the message "200 OK" to CA 106. CA 106 transmits the message "200 OK" to IP telephone A101.

Upon receiving the message "200 OK", IP telephone A101 transmits the message "ACK" to CA 106. Similarly, CA 106 transmits the message "ACK" to CA 108. CA 108 transmits the message "ACK" to IP telephone B102. When IP telephone B102 receives the message "ACK", IP telephone A101 and IP telephone B102 are ready to communicate via the IP network.

As described above, when communication is attempted via the IP network and when NAPTR resource record(s) that correspond(s) to the destination terminal is(are) not stored, CA 106 and CA 108 perform call management. Thus, CA 106 and CA 108 need to perform call management only when NAPTR resource record(s) that correspond(s) to the destination terminal is(are) not stored. This reduces the workload for CA 106 and CA 108.

As described above, in the IP telephone system according to the present embodiment, when IP telephone A101 places a call to IP telephone B102, IP telephone A101 first transmits, to ENUM server 109, a request for NAPTR resource record(s) that correspond(s) to IP telephone B102. When ENUM server 109 stores corresponding NAPTR resource record(s), call management is directly performed between IP telephone A101 and IP telephone B102 according to the NAPTR resource record. Then, voice communication is performed via the ENUM network or the PSTN. On the other hand, when ENUM server 109 does not store corresponding NAPTR resource record(s), CA 106 manages calls between IP telephone A101 and IP telephone B102. Then, voice communication is performed via the IP network. Accordingly, the workload for CA 106 is reduced, and voice communication can be performed via the IP network without requiring CA 106 to perform call management. As a result, the workload for CA 106 is reduced while increasing the processing volume of voice communication via the IP network. Also, ENUM server 109 only needs to return NAPTR resource record(s) without performing call management. Call management is directly performed between IP telephones A 101 and B102. Thus, the required cost will be lower than the cost required for communication by CA 106. As a result, IP telephone systems can be diffused more and more without requiring a significant cost.

In the present embodiment, a description is provided regarding an example where ENUM server 109 and ENUM server 111, which configure the ENUM network, are owned by provider A103 and provider B104, respectively. However, when ENUM server 109 and ENUM server 111 can be structured on a network, ENUM server 109 and ENUM server 111 do not necessary need to be owned by provider A103 and provider B104. In other words, carrier A105 and carrier B107 can own ENUM server 109 and ENUM server 111. However, it is preferable that provider A103 and provider B104 own ENUM server 109 and ENUM server 111 as a configuration of the present invention. Currently, providers provide IP telephone systems by leasing equipment from carriers. Thus, when a provider provides an IP telephone system which comprises ENUM server 109 and ENUM server 111, it is possible to cut down the cost needed to lease such equipment. Thus, in terms of the further diffusion of IP telephone systems, more rapid development is expected when provider A103 and provider B104 own ENUM server 109 and ENUM server 111.

Furthermore, in the above description, CA 106 and CA 108 execute only SIP as a VoIP protocol in the IP telephone system according to the present embodiment. However, the configuration is not limited to this setup. In other words, the configuration can accommodate H.323 as a VoIP protocol as well.

In the IP telephone system according to the present embodiment, voice is not limited to human voice. It also covers sounds in general, for example, modem signals modulated to voice bands and fax signals. Also, the telephone can be a fax apparatus as well.

The IP telephone described above includes an IP telephone defined by the government and operated by a telecommunications provider. It also includes an IP telephone provided on a local network or a private network using TCP/IP or other computer network protocols.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-117245 filed on Apr. 12, 2004, entire content of which is expressly incorporated by reference herein.

What is claimed is:

1. An IP telephone apparatus connected to an ENUM server, to a DNS server, and to a call agent apparatus, the ENUM server storing a NAPTR (Naming Authority Pointer) resource record, the NAPTR resource record including a URI and a corresponding ENUM domain name, the DNS server storing an IP address corresponding to the URI, the call agent apparatus controlling a connection between the IP telephone apparatus and a call destination, the IP telephone apparatus comprising:
   a key pad configured to input a telephone number of the call destination; and
   a controller configured
      to generate an ENUM domain name based on the input telephone number,
      to transmit, to the ENUM server, the generated ENUM domain name,
      to determine whether a NAPTR resource record corresponding to the transmitted ENUM domain name is received from the ENUM server,
      to determine, when the NAPTR resource record is received from the ENUM server, whether the received NAPTR resource record indicates that the call destination can perform a communication based on a SIP (Session Initiation Protocol),
      to transmit, to the DNS server, a URI contained in the received NAPTR resource record when the received NAPTR resource record indicates that the call destination can perform a communication based on the SIP,
to receive an IP address corresponding to the transmitted URI from the DNS server,
to access the call destination for a call by a Peer-to-Peer communication via an IP network based on the SIP, using the received IP address, without using the call agent apparatus,
to determine, when the received NAPTR resource record does not indicate that the call destination can perform a communication based on the SIP, whether the received NAPTR resource record indicates that the call destination can perform a communication via a PSTN (Public Switched Telephone Network), and
to call the call destination via the PSTN without using the call agent apparatus and without using the DNS server, when the received NAPTR resource record indicates that the call destination can perform a communication via the PSTN,
the controller being further configured to determine whether a message indicating that the call agent apparatus is unsuccessful in establishing communication with the call destination is received from the call agent apparatus, when the NAPTR resource record is not received from the ENUM server,
wherein, when it is determined that the controller receives a message other than the message indicating that the call agent apparatus is unsuccessful in establishing communication with the call destination, the controller accesses the call destination for a call via the call agent apparatus without using the DNS, such that the communication between the call agent apparatus and the call destination is selected from one of being performed through the IP network and being performed through the PSTN.

2. The IP telephone apparatus according to claim 1, wherein, in response to the ENUM domain name being transmitted to the ENUM server, the controller receives, from the ENUM server, one of a response including the NAPTR resource record corresponding to the transmitted ENUM domain name, and a response only indicating that the ENUM server does not have the NAPTR resource record corresponding to the transmitted ENUM domain name.

3. The IP telephone apparatus according to claim 1, wherein, when the received NAPTR resource record does not indicate that the call destination can perform a communication based on the SIP, the controller determines whether the received NAPTR resource record indicates that the call destination can perform a communication via the PSTN, without further sending the generated ENUM domain name to any other server.

4. The IP telephone apparatus according to claim 1, wherein, when the NAPTR resource record is not received from the ENUM server, the controller sends an INVITE message to the call agent apparatus, and waits for a message from the call agent apparatus in response to the INVITE message, and
the controller does not send the INVITE message to the call agent apparatus, until the controller determines that the NAPTR resource record is not received from the ENUM server.

5. The IP telephone apparatus according to claim 1, wherein, when the controller does not receive a response from the ENUM server after sending the ENUM domain name to the ENUM server, the controller terminates further processes.

6. An IP telephone system comprising:
an IP telephone apparatus;
an ENUM server configured to store a NAPTR (Naming Authority Pointer) resource record, the NAPTR resource record including a URI and a corresponding ENUM domain name;
a DNS server configured to store an IP address corresponding to the URI; and
a call agent apparatus configured to control a connection between the IP telephone apparatus and a call destination;
the IP telephone apparatus comprising:
a key pad configured to input a telephone number of the call destination;
a controller configured
to generate an ENUM domain name based on the input telephone number,
to transmit, to the ENUM server, the generated ENUM domain name,
to determine whether a NAPTR resource record corresponding to the transmitted ENUM domain name is received from the ENUM server,
to determine, when the NAPTR resource record is received from the ENUM server, whether the received NAPTR resource record indicates that the call destination can perform a communication based on a SIP (Session Initiation Protocol),
to transmit, to the DNS server, a URI contained in the received NAPTR resource record when the received NAPTR resource record indicates that the call destination can perform a communication based on the SIP,
to receive the IP address corresponding to the transmitted URI from the DNS server, and
to access the call destination for a call by a Peer-to-Peer communication via an IP network based on the SIP, using the received IP address, without using the call agent apparatus,
to determine, when the received NAPTR resource record does not indicate that the call destination can perform a communication based on the SIP, whether the received NAPTR resource record indicates that the call destination can perform a communication via a PSTN (Public Switched Telephone Network), and
to call the call destination via the PSTN without using the call agent apparatus and without using the DNS server, when the received NAPTR resource record indicates that the call destination can perform a communication via the PSTN,
the controller being further configured to determine whether a message indicating that the call agent apparatus is unsuccessful in establishing communication with the call destination is received from the call agent apparatus, when the NAPTR resource record is not received from the ENUM server,
wherein, when it is determined that the controller receives a message other than the message indicating that the call agent apparatus is unsuccessful in establishing communication with the call destination, the controller accesses the call destination for a call via the call agent apparatus without using the DNS, such that the communication between the call agent apparatus and the call destination is selected from one of being performed through the IP network and being performed through the PSTN.

7. The IP telephone system according to claim 6, wherein when the ENUM server receives the ENUM domain name transmitted from the controller of the IP telephone apparatus, the ENUM server returns, to the IP telephone apparatus, one of a response including the NAPTR resource record corresponding to the transmitted ENUM domain name, and a response only indicating that the ENUM server does not have the NAPTR resource record corresponding to the transmitted ENUM domain name.

8. The IP telephone system according to claim 6, wherein when the NAPTR resource record received by the IP telephone apparatus does not indicate that the call destination can perform a communication based on the SIP, the controller of the IP telephone apparatus determines whether the received NAPTR resource record indicates that the call destination can perform a communication via the PSTN, without further sending the generated ENUM domain name to any other server.

9. The IP telephone system according to claim 6, wherein, when the NAPTR resource record is not received from the ENUM server, the controller sends an INVITE message to the call agent apparatus, and waits for a message from the call agent apparatus in response to the INVITE message, and
the controller does not send the INVITE message to the call agent apparatus, until the controller determines that the NAPTR resource record is not received from the ENUM server.

10. The IP telephone system according to claim 6, wherein, when the controller does not receive a response from the ENUM server after sending the ENUM domain name to the ENUM server, the controller terminates further processes.

11. A method for calling, using an IP telephone apparatus connected to an ENUM server, a DNS server, and a call agent apparatus, the ENUM server storing a NAPTR (Naming Authority Pointer) resource record, the NAPTR resource record including a URI and a corresponding ENUM domain name, the DNS server storing an IP address corresponding to the URI, the call agent apparatus controlling a connection between the IP telephone apparatus and a call destination, the method comprising:
inputting a telephone number of the call destination;
generating an ENUM domain name based on the input telephone number;
transmitting, to the ENUM server, the generated ENUM domain name;
determining, at the IP telephone apparatus, whether a NAPTR resource record corresponding to the generated ENUM domain name is received from the ENUM server;
determining, when the NAPTR resource record is received, whether the received NAPTR resource record indicates that the call destination can perform a communication based on a SIP (Session Initiation Protocol);
transmitting, to the DNS server, a URI contained in the received NAPTR resource record when the received NAPTR resource record indicates that the call destination can perform a communication based on the SIP;
receiving an IP address corresponding to the transmitted URI from the DNS server;
accessing the call destination by a Peer-to-Peer communication via an IP network based on the SIP, using the received IP address, without using the call agent apparatus;
determining, when the received NAPTR resource record does not indicate that the call destination can perform a communication based on the SIP, whether the received NAPTR resource record indicates that the call destination can perform a communication via a PSTN (Public Switched Telephone Network),
calling the call destination via the PSTN without using the call agent apparatus and without using the DNS server, when the received NAPTR resource record indicates that the call destination can perform a communication via the PSTN,
determining whether a message indicating that the call agent apparatus is unsuccessful in establishing communication with the call destination is received from the call agent apparatus, when the NAPTR resource record is not received from the ENUM server, and
accessing, when it is determined that a message other than the message indicating that the call agent apparatus is unsuccessful in establishing communication with the call destination is received, the call destination for a call via the call agent apparatus without using the DNS, such that communication between the call agent apparatus and the call destination is selected from one of being performed through the IP network and being performed through the PSTN.

12. The method for calling according to claim 11, further comprising receiving, from the ENUM server, one of a response including the NAPTR resource record corresponding to the transmitted ENUM domain name, and a response only indicating that the ENUM server does not have the NAPTR resource record corresponding to the transmitted ENUM domain name.

13. The method for calling according to claim 11, wherein, when the received NAPTR resource record does not indicate that the call destination can perform a communication based on the SIP, it is determined whether the received NAPTR resource record indicates that the call destination can perform a communication via the PSTN, without further sending the generated ENUM domain name to any other server.

14. The method for calling according to claim 11, further comprising, when the NAPTR resource record is not received from the ENUM server, sending an INVITE message to the call agent apparatus, and waiting for a message from the call agent apparatus in response to the INVITE message,
wherein the INVITE message is not sent to the call agent apparatus, until it is determined that the NAPTR resource record is not received from the ENUM server.

15. The method for calling according to claim 11, wherein, when no response is received from the ENUM server after sending the ENUM domain name to the ENUM server, further processes are terminated.

* * * * *